United States Patent [19]

Phillips et al.

[11] 4,252,706
[45] Feb. 24, 1981

[54] METHOD FOR PRECISELY CONTROLLING THE DISSOLUTION RATE OF HIGH MOLECULAR WEIGHT WATER-SOLUBLE VINYL POLYMERS

[75] Inventors: Kenneth G. Phillips, River Forest; Alvin J. Frisque, Western Springs, both of Ill.

[73] Assignee: Nalco Chemical Company, Oak Brook, Ill.

[21] Appl. No.: 90,155

[22] Filed: Oct. 31, 1979

[51] Int. Cl.³ .................. C08L 33/02; C08L 33/26
[52] U.S. Cl. .................. 260/29.6 PM; 260/29.6 H; 260/29.6 WQ
[58] Field of Search ............ 260/29.6 H, 29.6 PM

[56] References Cited

U.S. PATENT DOCUMENTS

| | | | |
|---|---|---|---|
| Re. 28,474 | 7/1974 | Anderson et al. | 260/29.6 H |
| Re. 28,576 | 10/1975 | Anderson et al. | 260/29.6 H |
| 3,171,805 | 3/1965 | Suen et al. | 210/54 |
| 3,259,570 | 7/1966 | Priesing et al. | 210/53 |
| 3,284,393 | 11/1966 | Vanderhoff et al. | 260/29.6 H |
| 3,418,237 | 12/1968 | Booth et al. | 210/54 |
| 3,624,019 | 11/1971 | Anderson et al. | 260/29.6 H |
| 3,734,873 | 5/1973 | Anderson et al. | 260/29.6 H |
| 3,767,629 | 10/1973 | Vallino, Jr. et al. | 260/80.3 N |
| 3,826,771 | 7/1974 | Anderson et al. | 260/29.6 H |
| 3,915,920 | 10/1975 | Slovinsky et al. | 260/29.6 RW |
| 3,996,180 | 12/1976 | Kane | 260/29.6 H |
| 3,997,492 | 12/1976 | Kane et al. | 260/29.6 WQ |
| 4,024,097 | 5/1977 | Slovinsky et al. | 260/29.6 N |

OTHER PUBLICATIONS

The Atlas HLB System, 4th Printing, Atlas Chemical Ind., Inc., (1963).
Rosen, Milton J., "Surfactants and Interfacial Phenomena," John Wiley & Sons, p. 234, (1978).

*Primary Examiner*—Stanford M. Levin
*Attorney, Agent, or Firm*—John G. Premo; Robert A. Miller

[57] ABSTRACT

The dissolution rate of water-soluble polymers in water can be precisely controlled. This is accomplished by inverting a water-in-oil emulsion containing the water-soluble vinyl polymer into water which contains at the time of inversion an exact amount of an emulsifier system having an HLB number which has been predetermined to produce a specific solubility rate for the water-soluble vinyl polymer.

5 Claims, 7 Drawing Figures

EFFECT OF HLB ON INVERSION OF HIGH MOLECULAR WEIGHT POLYSODIUMACRYLATE

△ 8
× 9
◇ 10
□ 12.5

METHOD FOR PRECISELY CONTROLLING THE DISSOLUTION RATE OF HIGH MOLECULAR WEIGHT WATER-SOLUBLE VINYL POLYMERS

It is now known that aqueous solutions of water-soluble vinyl polymers may be prepared rapidly by inverting into water water-in-oil emulsions of these vinyl polymers. This technology is described in Anderson/Frisque U.S. No. Re. 28,474 and U.S. No. Re. 28,576.

The inversion of water-in-oil emulsions which contain water-soluble vinyl polymers to produce rapidly dilute aqueous solutions of these polymers has been practiced in a variety of forms commercially for the past several years. The most common method of utilizing this technology resides in preparing the water-in-oil emulsions containing the water-soluble vinyl polymers by an emulsion polymerization technique such as is shown in Vanderhoff, U.S. Pat. No. 3,284,393.[1] In this polymerization process it is customary to use a water-in-oil emulsifying agent to prepare the polymer-containing emulsions. Upon completion of the polymerization, there is added to the finished emulsions a compatible water-soluble surfactant. These emulsions containing the compatible water-soluble surfactant may be then added to water under conditions of mild agitation. This results in an inversion of the emulsion to form an oil-in-water emulsion and a rapidly formed solution of the water-soluble polymers.

[1] Vanderhoff, after producing water-in-oil emulsions of the water-soluble vinyl polymers, subjects these emulsions to precipitation to separate the polymers from the emulsion. Rapid solubilization by inversion as taught in U.S. No. Re. 28,576, is not shown or suggested by Vanderhoff.

This inversion technique to produce rapid solubilization of water-soluble vinyl polymers is primarily used to dissolve polymers having molecular weights in excess of 1,000,000. This allows speed of dissolution to be achieved which is far greater than the dissolution rate of the corresponding dry polymers having approximately identical compositions and molecular weights.

While the use of water-in-oil emulsions of water-soluble polymers in conjunction with water-soluble surfactants to provide a method of rapidly dissolving these polymers has greatly increased the convenience of using these polymers, certain anomalies have developed in using this technique.

In certain cases when the water-in-oil emulsions are combined with a water-soluble surfactant, either in a form which is compatible with the emulsion or the surfactant is added into the water into which the emulsion is to be inverted, difficulty is sometimes experienced with the rate of solution insofar as it takes far longer than is normally anticipated. Such situations, although not occurring often, do occur and have been incapable of explanation. In an effort to correct such occurrences, attempts have been made to decrease the stability of the starting emulsions by using less or a different water-in-oil emulsifier, or to increase the amount of the water-soluble surfactant used to invert the emulsions. Even these modifications are not always effective in producing a rapid dissolution which occurs over the same time period.

In summary, therefore, it might be said that while it is possible to prepare rapidly solutions of water-soluble polymers using the teachings of U.S. No. Re. 28,474 and U.S. No. Re. 28,576, such techniques can be considered as trial and error methods. There is no exact basis for predicting the solubility rate characteristics of these systems.

In several commercial areas such as secondary or tertiary recovery of petroleum, which is also called waterflood or polymer flooding, or in friction reduction applications, it would be desirable if it were possible to control the dissolution rate of water-soluble vinyl polymers so they would be gradually released into solution. Until the present no such practical system has been evolved. Attempts have been made at chemical modification of polymers to control their solubility, but this approach is expensive and is difficult to perform successfully on a commercial basis.

THE INVENTION

The invention comprises a method of precisely controlling the dissolution rate of a water-soluble vinyl polymer into water which comprises inverting a water-in-oil emulsion containing the water-soluble vinyl polymer into water which contains at the time of inversion an exact amount of an emulsifier system having an HLB number which has been predetermined to produce a specific solubility rate for the water-soluble vinyl polymer and then dissolving the polymer at a predetermined controlled rate.

THE DRAWINGS

The drawings illustrate the effect of HLB number in relation to the dissolution rate of water-soluble vinyl polymers. Specifically:

Figure 1:
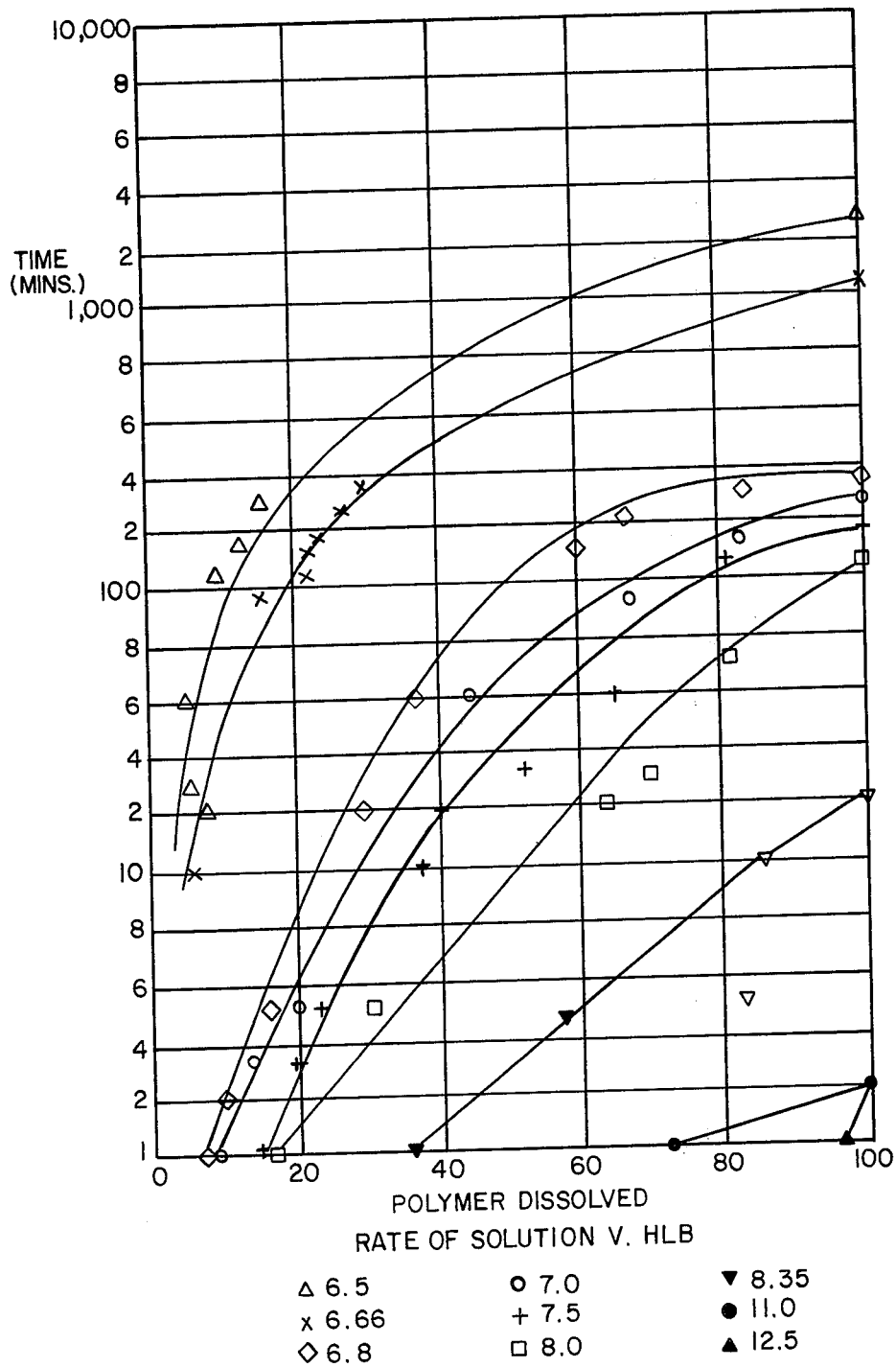
FIG. 1 is "Rate of Solution v. HLB"

The Water-in-Oil Emulsions of Water-Soluble Vinyl Polymers

The water-in-oil emulsions of water-soluble vinyl polymers useful in the practice of this invention contain four basic components. These components and their weight percentages in the emulsions are listed below:

A. Water-soluble vinyl polymer:
 1. Generally from 5–60%;
 2. Preferably from 20–40%; and
 3. Most preferably from 25–35%;

B. Water:
 1. Generally from 20–90%;
 2. Preferably from 20–70%; and
 3. Most preferably from 30–55%;

C. Hydrophobic liquid:
 1. Generally from 5–75%;
 2. Preferably from 5–40%; and
 3. Most preferably from 20–30%; and D. Water-in-oil emulsifying agent:
 1. Generally from 0.1–21% ;
 2. Preferably from 1–15%;
 3. Most preferably from 1.2–10%.

It is also possible to further characterize the water-in-oil emulsions of water-soluble vinyl polymers with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and, most preferably, from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5–14, and, most preferably, from 1.0–2.75.

In certain instances it is possible to remove substantial quantities of water from the above emulsions while still maintaining the physical and chemical characteristics of the emulsions. Such concentrated, substantially water-free emulsions, e.g. less than 3% by weight water, are contemplated as being capable of use in the practice of this invention.

A simple method for removing water from emulsions of the type described consists of heating said emulsions in the presence of an azeotropic agent for water such as toluene with the temperature being sufficient to form an azeotrope which thereby allows water removal to be achieved. This also allows the emulsion to remain in the form of a water-in-oil emulsion even though it contains very little water.

The Water-Soluble Vinyl Polymers

Typical polymers that may be polymerized using water-in-oil polymerization techniques include a wide variety of both homo and copolymers. Some of the most common polymers used industrially are the homo and copolymers of acrylamide and acrylic acid. In the case of acrylamide polymers, it includes homo polymers of acrylamide as well as copolymers of acrylamide with other water-soluble vinyl monomers, which copolymers may contain between 5–95% by weight of acrylamide. Similarly, acrylic acid polymers include the homo and copolymers of acrylic acid, particularly its water-soluble salts, e.g. sodium acrylate. The copolymers may contain between 5–95% by weight of acrylic acid or its soluble salts. Thus, the expression "acrylamide polymers" or "acrylic acid polymers" include those homo and copolymers thus described.

While the acrylamide and acrylic acid polymers represent a large share of polymers used in many industrial applications, other polymers are capable of being prepared as water-in-oil emulsions. Examples of such polymers are described in the following U.S. Pat. Nos. 3,418,237, 3,259,570, and 3,171,805.

In the practice of the invention, it is customary to form water-in-oil emulsions of water-soluble vinyl polymers having a molecular weight of at least 1,000,000 or more. This is so because polymers having a low molecular weight normally dissolve quite rapidly whereas polymers having higher molecular weights take protracted periods of time for complete dissolution to be achieved. Therefore, the present invention contemplates employing in its practice water-in-oil emulsions of the water-soluble vinyl polymers which have a molecular weight of at least 1,000,000. The invention is advantageous in aiding in the controlled dissolution of polymers having molecular weights ranging from 1,000,000 up to as high as 20,000,000 or more.

The Hydrophobic Liquids

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain isoparaffinic solvent sold by Humble Oil and Refinery Company under the tradename "Isopar M" descibed in U.S. Pat. No. 3,624,019 and a paraffinic solvent sold by the Exxon Company, U.S.A. called "Low Odor Paraffinic Solvent." Typical specifications of this material are set forth below in Table I.

TABLE I

| | |
| --- | --- |
| Specific Gravity 60°/60° F. | 0.780–0.806 |
| Color, Saybolt | + 30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances, petroleum, may be used. While useful in this invention, solvents such as benezene, xylene, toluene, and other water immiscible hydrocarbons having low flash points or toxic properties are generally avoided due to problems associated with their handling.

The Preparation of the Water-in-Oil Emulsions of Water-Soluble Vinyl Polymers The general method for the preparation of emulsions of the type described above is contained in Vanderhoff, U.S. Pat. No. 3,284,393, which is hereinafter incorporated by reference. A typical procedure for preparing water-in-oil emulsions of this type includes preparing an aqueous solution of a water-soluble vinyl monomer and adding this solution to one of the hydrocarbon oils described above. With the addition of a suitable water-in-oil emulsifying agent and under agitation, the emulsion is then subjected to free radical polymerization conditions and a water-in-oil emulsion of the water-soluble vinyl polymer is obtained. It should be pointed out that the ingredients are chosen based upon the weight percentages given above and their compatability with each other. As to choice of free radical catalyst, these materials may be either oil or water soluble and may be from the group consisting of organic peroxides, Vazo type materials, redox type initiator systems, etc. Additionally, ultraviolet light, microwaves, etc. will also cause the polymerization of water-in-oil emulsions of this type.

In the manufacture of emulsions of this type, which are further detailed in U.S. Pat. No. 3,624,019, U.S. Pat. No. Re. 28,474, U.S. Pat. No. 3,734,873, U.S. Pat. No. Re. 28,576, U.S. Pat. No. 3,826,771, all of which are hereinafter incorporated by reference, the use of air may be employed to control polymerization. This technique is described in U.S. Pat. No. 3,767,629 which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers such as polyisobutylene. Employment of techniques of this type provides for superior stabilized emulsions.

Of still further interest is U.S. Pat. No. 3,997,492 which describes the formation of water-in-oil emulsions of the type above described utilizing emulsifiers having HLB values of between 4–9.

HLB of the Emulsifiers to Precisely Control the Dissolution Rate of the Water-Soluble Vinyl Polymers As discussed in both the prior art and above, it is customary to conduct these emulsion polymerizations utilizing a water-in-oil emulsifying agent. These emulsions are then inverted into water to produce rapid dissolution of the polymers with the inversion being achieved in most commercial applications of this technology by the use of a water-soluble surfactant which is either incorporated into the emulsion prior to use or is added to the water into which the water-in-oil emulsion which contains the polymer is inverted. The water-soluble surfactant causes inversion of the emulsion to form an oil-in-water emulsion. Thus, the inverting agent is also an emulsifier.

Emulsifiers may be classified by using the Atlas HLB System. This system is described in the publication entitled, *The Atlas HLB System*, 4th Printing, Atlas Chemical Industries, Inc., Wilmington, Delaware © 1963. This publication and its entire contents are incorporated herein by reference and made a part of this specification. Generally, oil-soluble emulsifiers produce water-in-oil emulsions whereas water-soluble emulsifiers produce oil-in-water emulsions.

Also, as a general rule, the HLB number of the oil-soluble emulsifier will range between 4–9 whereas the HLB number of the water-soluble surfactant or emulsifier will have a value of approximately 8–40. In certain cases a single surfactant may be capable of producing either a water-in-oil or oil-in-water emulsion.

When the water-in-oil emulsions of the water-soluble vinyl polymers are added to water, there is provided in the water an emulsifier system which has a specific HLB. This emulsifier system may be either:

1. a water-in-oil emulsifying agent which was originally present in the water-in-oil emulsion; or
2. a water-in-oil emulsifying agent in combination with an oil-in-water emulsifying agent or surfactant.

In the case of 2.0 the surfactant was present in the water-in-oil emulsion of the polymer or was separately added to the water prior to emulsion. The HLB of these systems is either:

(a) the HLB of a water-in-oil emulsifying agent, or
(b) the HLB of the combined water-in-oil emulsifying agent plus the oil-in-water emulsifying agent.

The HLB of these emulsifier systems can be determined by using known measuring techniques or when the systems are totally nonionic by calculation.

The premise upon which this invention is based resides in the discovery that the use of an emulsifier system having a precise HLB value is capable of releasing the water-soluble vinyl polymer into solution at a precise predetermined rate. By determining the solubility rate of the polymer caused by inverting the water-in-oil emulsion in water over a range of HLB values, it is possible to determine the rate of polymer dissolution for any HLB number. This may be conveniently plotted in the form of a curve on a graph. Thus, by exactly controlling the HLB of the emulsifier system based on such a graph, it is possible to control the dissolution rate of the polymer in the water with extreme exactness. Any point on such a graph will give a specific rate of dissolution.

In the practice of the invention and for most commercial applications, it is desirable to use as the emulsifier system a blend of the water-in-oil emulsification agent along with an oil-in-water emulsification agent which is most preferably a water-soluble nonionic surfactant. It is understood, however, that sometimes only the water-in-oil emulsifying agent may be employed. This, though, represents a least preferred embodiment of the invention since it provides only a limited range of dissolution rates. The rate of solubility of the polymer is in proportion to the HLB of the emulsifier system in the water, e.g. the higher the HLB, the more rapid the dissolution.

A typical HLB of the preferred emulsifier system is readily determined by using the HLB calculation for blended emulsifiers set forth on page 3 of the publication, *The Atlas HLB System*, previously referred to.

It will be understood that the amount of the emulsifier system must be within certain finite amounts. Thus, the water-in-oil emulsifier must be used in an amount sufficient to produce emulsification of the water-in-oil which contains the water-soluble vinyl polymer dispersed throughout the aqueous phase.

Similarly, the amount of water-soluble surfactant or oil-in-water emulsification agent must be sufficient to cause inversion of the emulsion and contribute to produce the desired HLB value of the system.

The water-soluble emulsifier is preferably nonionic. While other water-soluble emulsifiers may be used which are ionic in character, e.g. anionic or cationic, they must be used with care since the ionic nature of these materials tends to interreact with certain of the polymers and their ionic nature requires that their HLB be determined experimentally. Also, the ionic nature of certain emulsifiers can interfere with the HLB of the water-in-oil emulsifying agent. Effects of this type are described in the textbook by Milton J. Rosen entitled, *Surfactants and Interfacial Phenomena*, John Wiley & Sons, 1978, at page 234.

For a partial list of water-soluble emulsifiers that may be used in the practice of the invention, see the emulsifiers listed in Anderson/Frisque, U.S. No. Re. 28,474.

The characteristic that distinguishes the present invention from the invention taught in Anderson/Frisque, U.S. No. Re. 28,474 and U.S. No. Re. 28,576, is that in order to achieve rapid dissolution with Anderson/Frisque, the amount of surfactant used to cause rapid dissolution of the polymer could be any amount in excess of that minimum amount necessary to achieve rapid dissolution. Thus, rapid dissolution is achieved by Anderson/Frisque on a "hit or miss" basis. The exact time of dissolution under Anderson/Frisque, although under 2 minutes and frequently less than 30 seconds, could never be achieved by using what may be considered minimal optimal amount of water-soluble surfactants. If such a minimal amount were used, it was done so by accident rather than by design.

With Anderson/Frisque is was also impossible to control with exactitude those cases where it was desirable to control the exact dissolution rate of the dissolving polymers for periods of time exceeding 2 minutes.

Physical Properties of The Water-in-Oil Emulsions

The water-in-oil emulsions of the finely divided water-soluble polymers found useful in this invention contain relatively large amounts of polymer. The polymers dispersed in the emulsion are quite stable when the particle size of the polymer is from the range of 0.1 microns up to about 25 microns. The preferred particle size is generally within the range of 0.2 microns to about 5 microns. A most preferred particle size is generally within the range of 0.2 to 2.0 microns.

The emulsions prepared having the above composition generally have a viscosity in the range of from 50 to 6000 cps. It will be seen, however, that the viscosity of these emulsions can be affected greatly by increasing or decreasing the polymer content, oil content, or water content.

EXAMPLES

To illustrate the many advantages of the invention, the following is given by way of example.

EXAMPLE 1

Effect of HLB on Rate of Inversion of Polysodiumacrylate

A sodium polyacrylate was made using a dual emulsifier having an HLB of 8.35, as indicated below:

| Oil Phase: | Span 80 (Sorbitan Monooleate) (HLB 4.3) | 25.4g |
|---|---|---|
| | Surfactant (Nonyl Phenol Reacted with 7–8 moles Ethylene Glycol) (HLB 12.4) | 25.4g |
| | Isopar | 508.8g |
| Monomer Phase: | Acrylic Acid | 128.7g |
| | 50% NaOH | 143.0g |
| | Water | 168.9g |

The oil phase was heated to 60° C. yielding a hazy solution; to this was added the monomer phase and 3.77 ml. of benzoyl peroxide in toluene and the mixture stirred at 800 R.P.M. Nitrogen was introduced at 1000 ml./min. and reaction soon occurred. It was maintained at 60° C. with any necessary heating and cooling for 5 hours to produce a good stable emulsion, intrinsic viscosity 14.2.

The emulsion thus prepared was basic for determining all the inversion rates.

In order to obtain the rate of inversion at HLB's greater than 8.35, a weighed quantity of polymer was rapidly added to a stirred solution of nonyl phenol reacted with 9–10 moles ethylene oxide, HLB 13.4 (calculated amount to give desired overall HLB) at 1000 r.p.m. The Brookfield viscosity was determined as a variable with time until a constant reading was obtained. The polymer solution obtained was diluted with water to obtain a Brookfield viscosity versus solids curve, which was used to translate the originally obtained viscosities into percent of polymer in solution. At HLB 8.35, the original emulsion was directly self-inverted into water in a similar manner to that already described.

Finally, to determine the rate of solution at lower overall HLB values, Span 80 was added (in the necessary calculated amount) to the emulsion thoroughly mixed and the inversion carried out in a similar manner to already described.

Figure 2:
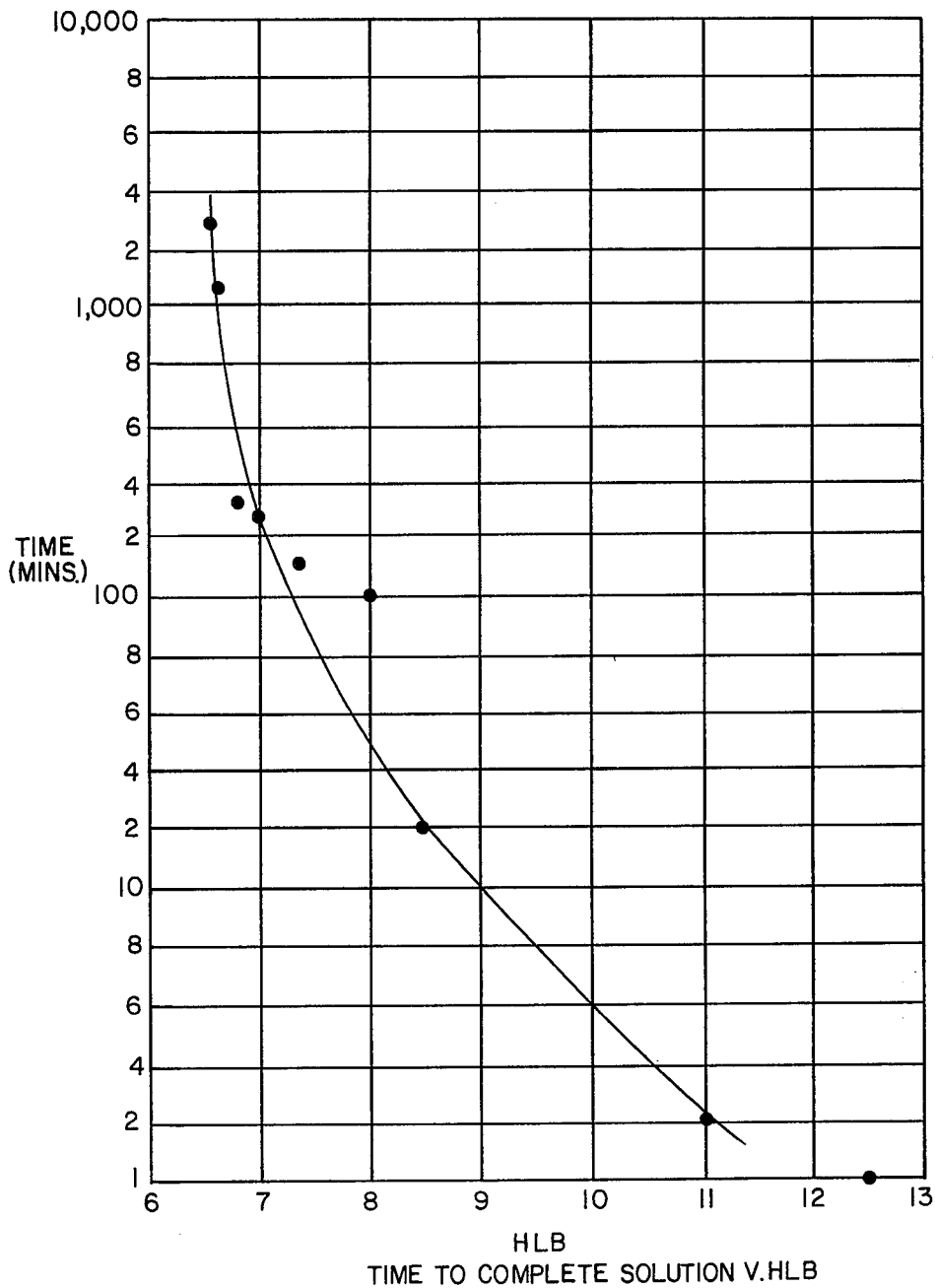
FIG. 2 is "Time to Complete Solution v. HLB"

The results are given in FIG. 1 and FIG. 2.

EXAMPLE 2

Effect of Amount of Emulsifiers and HLB of Inverter

Having shown the dependence of rate of solution on HLB, it was necessary to demonstrate its dependence on the amount of total emulsifiers used.

Two polymers of polysodiumacrylate were made using Span 80 at 150% and 200% of the emulsifier levels described before in Example 1.

These polymers were made in a similar manner to Example 1 and to obtain intrinsic viscosities in a similar range to the product used in Example 1.

| 1.5 × Span 80 | Intrinsic Viscosity 8.46 |
|---|---|
| 2.0 × Span 80 | Intrinsic Viscosity 7.99 |

These materials were inverted in a similar manner to before using more high HLB inverter to obtain the higher overall HLB's. The 150% level of emulsifier was inverted with nonyl phenol reacted with 9–10 moles ethylene oxide, HLB of 13.4, and the 200% level with nonyl phenol reacted with 7–8 moles ethylene oxide, HLB 12.4.

Figure 3:
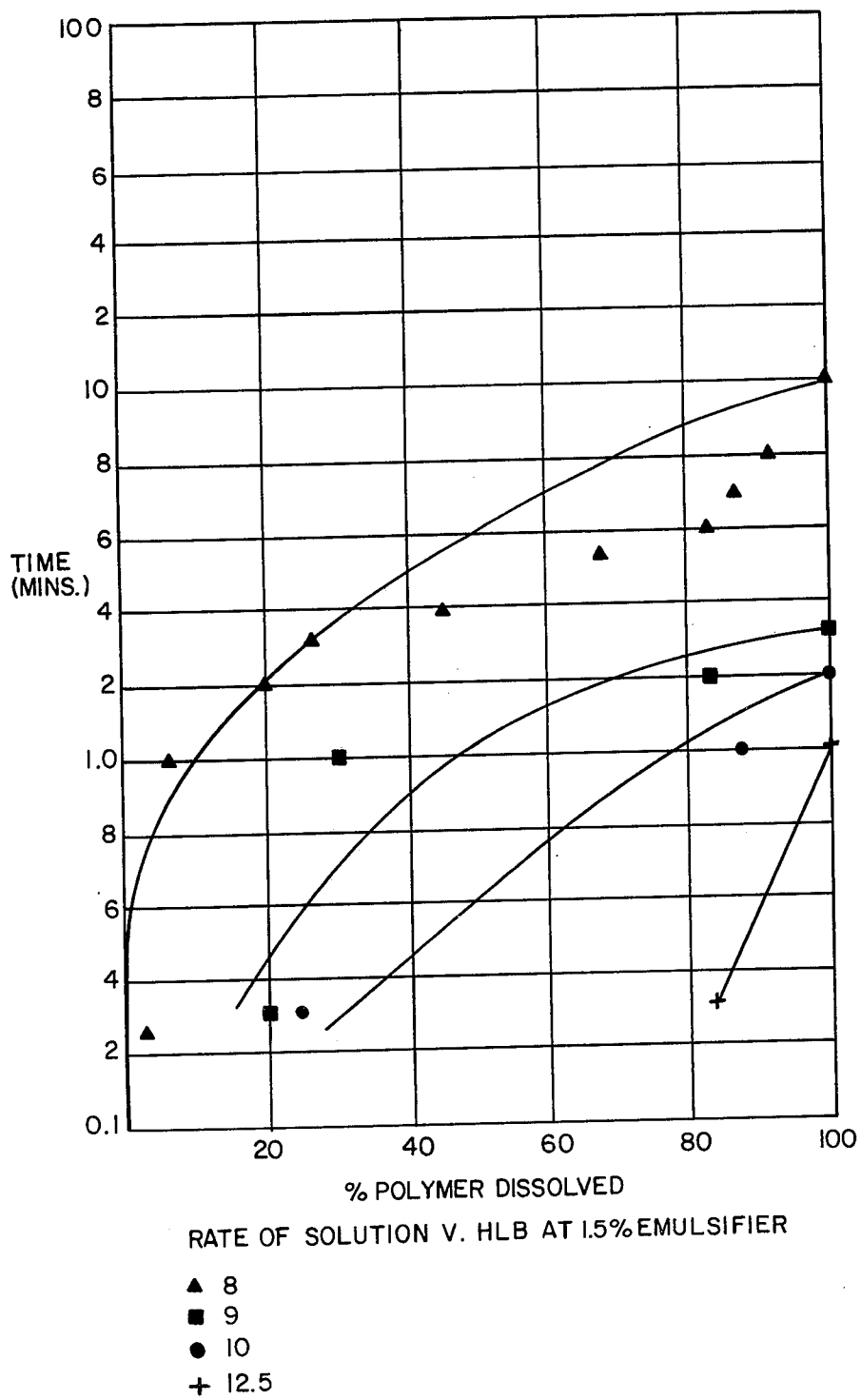
FIG. 3 is "Rate of Solution v. HLB at 1.5% Emulsifier"
Figure 4:
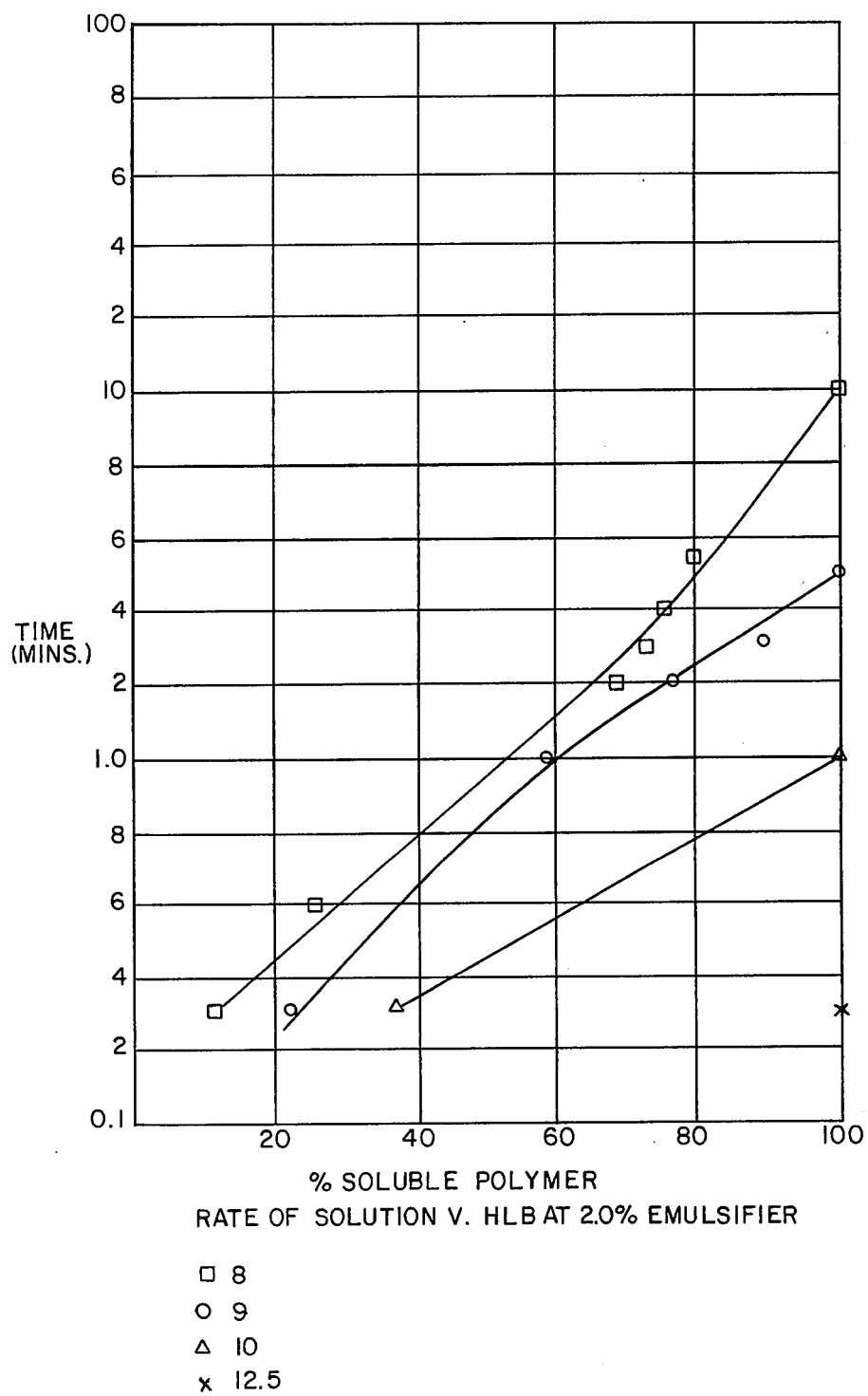
FIG. 4 is "Rate of Solution v. HLB at 2.0% Emulsifier"

The results are given in FIGS. 3 and 4.

EXAMPLE 3

Effect of Molecular Weight of Polymers and HLB on Rate of Solution

A sodiumpolyacrylate of intrinsic viscosity 20.6 using double the amount of Span 80 used in the preparation of Example 2 was made.

This polymer was used as the basis for determining the effect of HLB and molecular weight on rate of solution.

Figure 5:
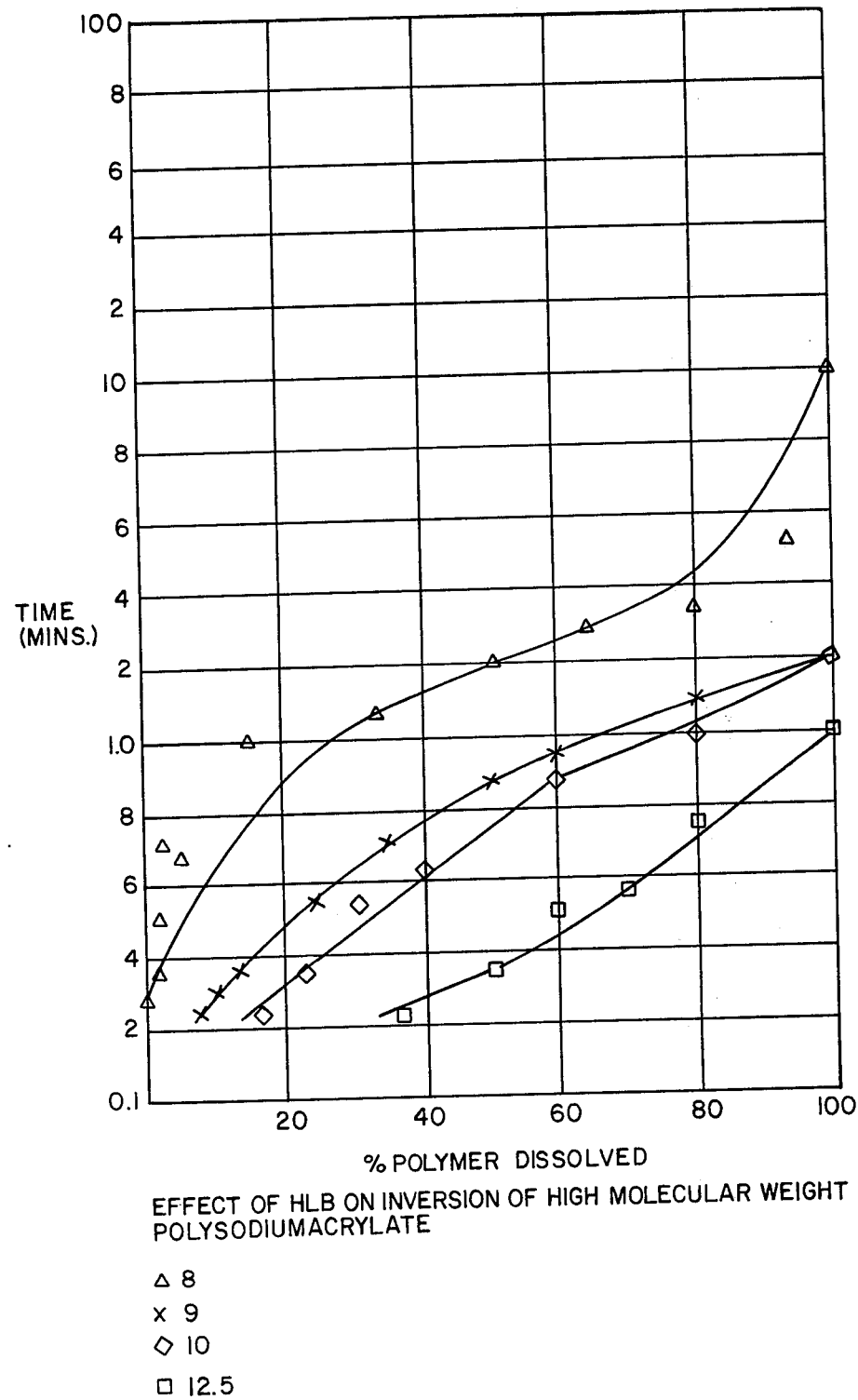
FIG. 5 is "Effect of HLB on Inversion of High Molecular Weight Polysodiumacrylate"

The results are given in FIG. 5.

EXAMPLE 4

Effect of Ionic Versus Nonionic Inverter

Figure 6:
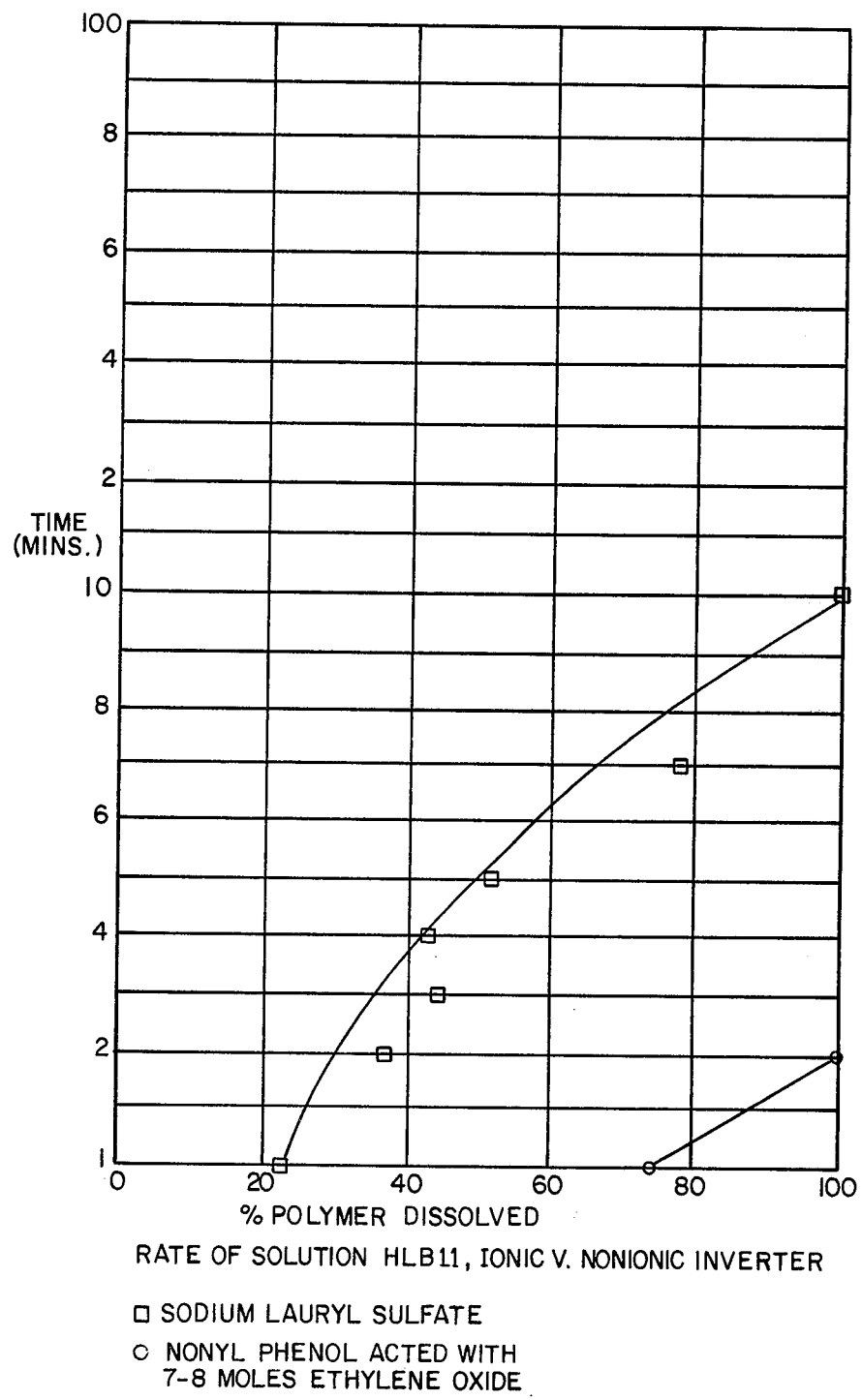
FIG. 6 is "Rate of Solution HLB11, Ionic v. Nonionic Inverter"

Using the emulsion of polysodiumacrylate from Example 1, the rates of solution were determined at an overall HLB of 11, obtained by using:
 a. sodium lauryl sulfate, HLB 40
 b. nonyl phenol reacted with 7–8 moles ethylene oxide The data is plotted in FIG. 6.

EXAMPLE 5

Figure 7:
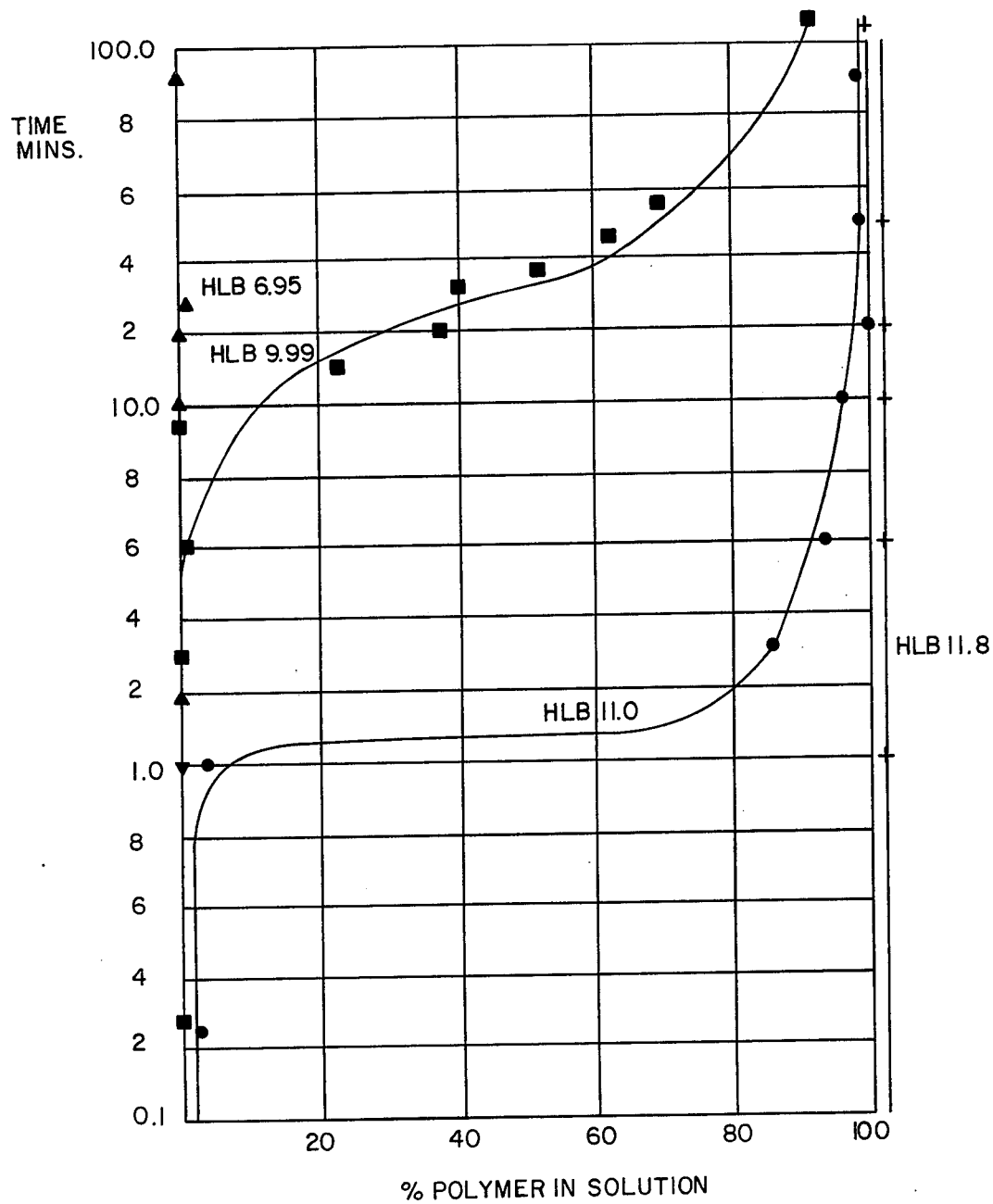
FIG. 7 is the Relationship of HLB to the Dissolution Rate for a High Molecular Weight Polyacrylamide.

Using the same experimental techniques, a curve was developed showing the relationship of HLB to dissolution rate for a polyacrylamide having a molecular weight in excess of 1,000,000. This data is set forth in FIG. 7.

SUMMARY

Based on the proceeding examples, the following conclusions may be reached:
- A. The rate of solution is related to the HLB of the emulsifier system, e.g. the lower the value, the slower the rate of solution.
- B. The rate of solution is affected by the total emulsifier level used. At a constant HLB, the more total emulsifier, the faster the rate.
- C. The rate of solution of a high molecular weight polymer is independent of the molecular weight of the polymer within wide limits.
- D. The use of sodium lauryl sulfate as the high HLB component of the overall HLB of the system gave different results to those obtained with the standard nonionic types.

Having thus described our invention, it is claimed as follows:

1. A method of precisely controlling the dissolution rate of a water-soluble vinyl polymer into water which comprises inverting a water-in-oil emulsion containing the water-soluble vinyl polymer into water which contains at the time of inversion an exact amount of an emulsifier system having an HLB number which has been predetermined to produce a specific solubility rate for the water-soluble vinyl polymer, said predetermination having been made by inverting the water-in-oil emulsion of the water-soluble polymer in water over a range of HLB numbers to determine the rate of dissolution of the water-soluble vinyl polymer for this range of HLB numbers and then dissolving the polymer at such predetermined specific rate.

2. The method of claim 1 where the water-soluble vinyl polymer is from the group consisting of acrylamide polymers and acrylic acid polymers.

3. The method of claim 1 where the emulsifier system contains a nonionic water-soluble surfactant.

4. The method of claim 1 where the emulsifier system contains both an oil-soluble emulsifier and a nonionic water-soluble surfactant with the oil-soluble emulsifier being originally contained in the water-in-oil emulsion of the water-soluble vinyl polymer.

5. The method of claim 4 where the water-soluble vinyl polymer is from the group consisting of acrylamide polymers and acrylic acid polymers.

* * * * *